(12) United States Patent
Williams et al.

(10) Patent No.: US 11,247,735 B2
(45) Date of Patent: Feb. 15, 2022

(54) EXPANDIBLE HEIGHT CARGO BED SYSTEM WITH MID-BED ACCESS

(71) Applicant: Toyota Motor Engineering & Manufacturing North America, Inc., Plano, TX (US)

(72) Inventors: Paxton S. Williams, Milan, MI (US); Colby Steven Williams, Milan, MI (US); Marjorie R. Williams, Ann Arbor, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 172 days.

(21) Appl. No.: 16/722,280

(22) Filed: Dec. 20, 2019

(65) Prior Publication Data

US 2021/0188370 A1  Jun. 24, 2021

(51) Int. Cl.
*B62D 33/08* (2006.01)
*B62D 33/03* (2006.01)

(52) U.S. Cl.
CPC ............. *B62D 33/08* (2013.01); *B62D 33/03* (2013.01)

(58) Field of Classification Search
CPC ...... B62D 33/08; B62D 33/03; B62D 33/037; B62D 33/0207; B62D 33/027; B62D 33/0276
USPC ..... 296/3, 32, 36, 39.2, 26.02, 26.04, 26.05, 296/26.06, 26.07
See application file for complete search history.

(56) References Cited

U.S. PATENT DOCUMENTS

| 2,581,556 | A | * | 1/1952 | Rogers | ..................... B60P 3/34 296/171 |
| 9,540,050 | B2 | | 1/2017 | Miller | |
| 2001/0050489 | A1 | * | 12/2001 | Felix | .................. B62D 33/0276 296/32 |
| 2003/0141733 | A1 | | 7/2003 | Burg | |
| 2019/0210664 | A1 | | 7/2019 | Williams | |

* cited by examiner

*Primary Examiner* — Stephen T Gordon
(74) *Attorney, Agent, or Firm* — Christopher G. Darrow; Darrow Mustafa PC

(57) ABSTRACT

A cargo bed system for a vehicle includes an inner shell and an outer shell operably coupled to the inner shell so as to be movable with respect to the inner shell between a lowered position and a raised position so as to vary a height of a cargo bed defined by the cargo bed system.

7 Claims, 4 Drawing Sheets

US 11,247,735 B2

EXPANDIBLE HEIGHT CARGO BED SYSTEM WITH MID-BED ACCESS

TECHNICAL FIELD

The present invention relates to mechanisms enabling an increase in the height of a vehicle cargo bed and, more particularly, to an expandable height cargo bed system having a first, static portion and a second portion movable with respect to the first portion to increase the height of the cargo bed.

BACKGROUND

Users sometimes find it useful to be able to increase the height of a vehicle cargo bed, such as a pickup truck cargo bed. In addition, when the cargo bed height is increased, it may be difficult to access the interior of the cargo bed from outside the bed.

SUMMARY

In one aspect of the embodiments described herein, a cargo bed system for a vehicle is provided. The system includes an inner shell and an outer shell operably coupled to the inner shell so as to be movable with respect to the inner shell between a lowered position and a raised position so as to vary a height of the cargo bed defined by the cargo bed system.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
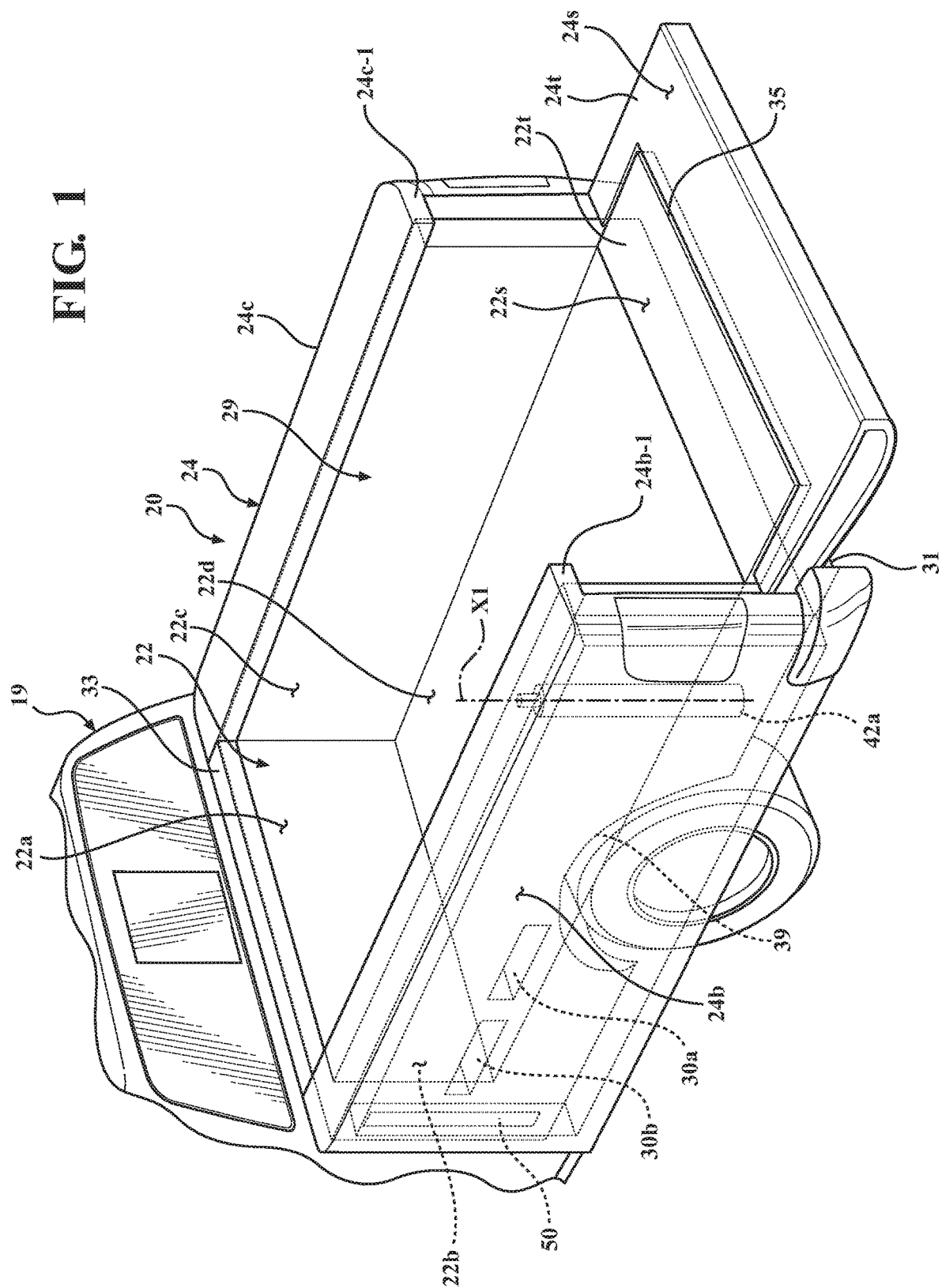
FIG. 1 is a schematic perspective view of an expandable height cargo bed system for a vehicle in accordance with an embodiment described herein, showing an outer shell of the system in a lowered position and with tailgates of the vehicle in lowered positions.

Embodiments described herein relate to a cargo bed system for a vehicle. The system includes an inner shell and an outer shell operably coupled to the inner shell so as to be movable with respect to the inner shell between a lowered position and a raised position so as to vary a height of a cargo bed defined by the cargo bed system. In addition, the inner shell may include an inner shell first sidewall having at least one cargo bed access passage extending between a first side of the inner shell first sidewall and a second side of the inner shell first sidewall opposite the first side. The outer shell may have an outer shell first sidewall structured to cover the at least one cargo bed access passage when the outer shell is in the lowered position, and structured such that the at least one cargo bed access passage is not covered by the outer shell first sidewall when the outer shell is in the raised position.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

Figure 2A:
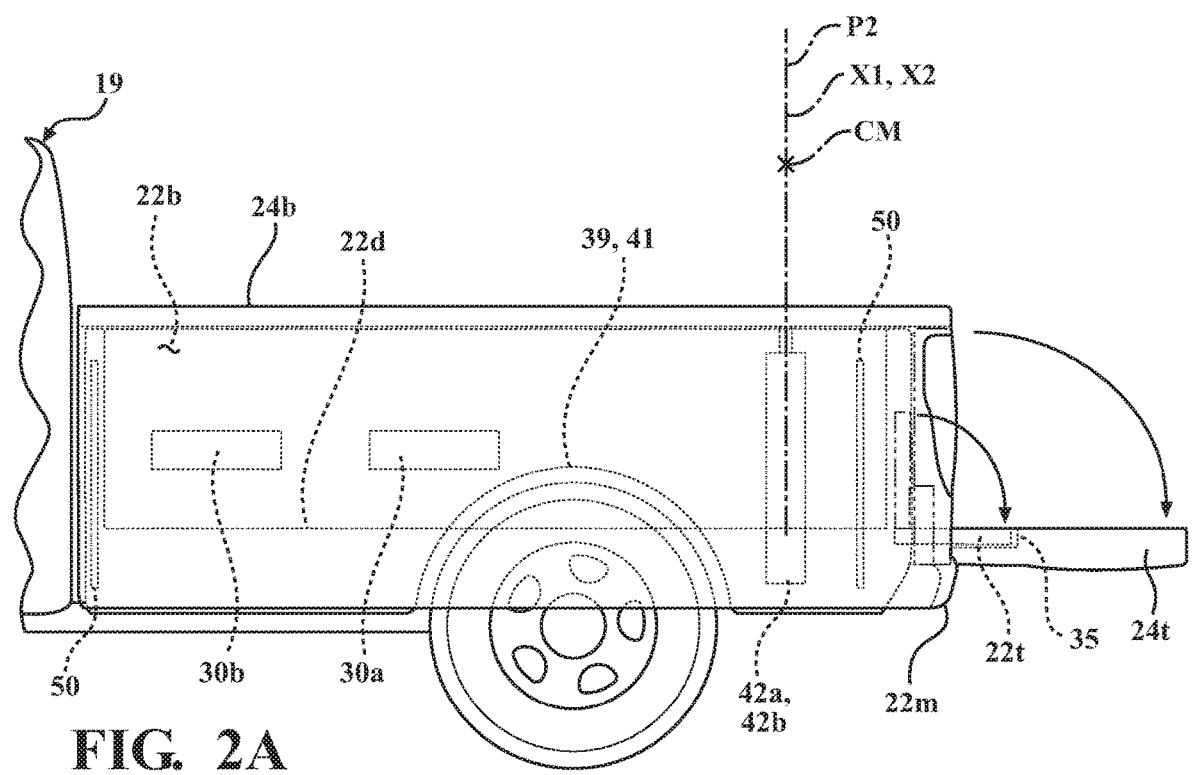
FIG. 2A is a schematic side rear view of the expandable height cargo bed system shown in FIG. 1.
Figure 2B:
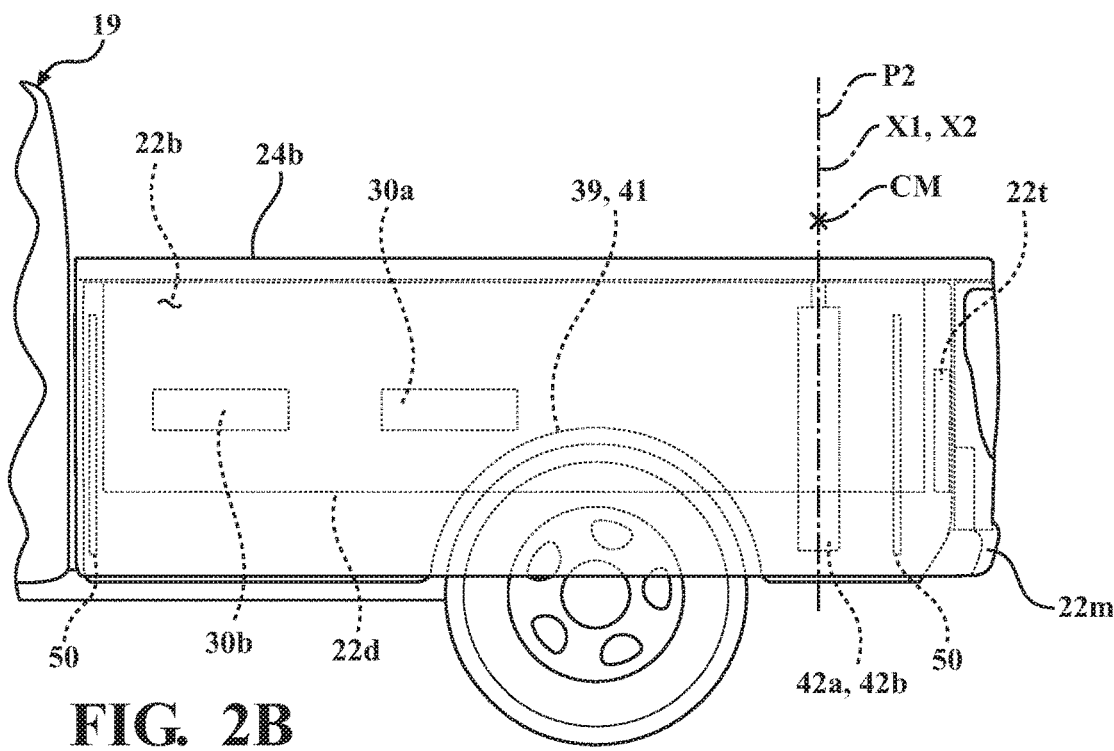
FIG. 2B is a schematic side view of the expandable height cargo bed system shown in FIG. 2A, with the tailgates raised.
Figure 2C:
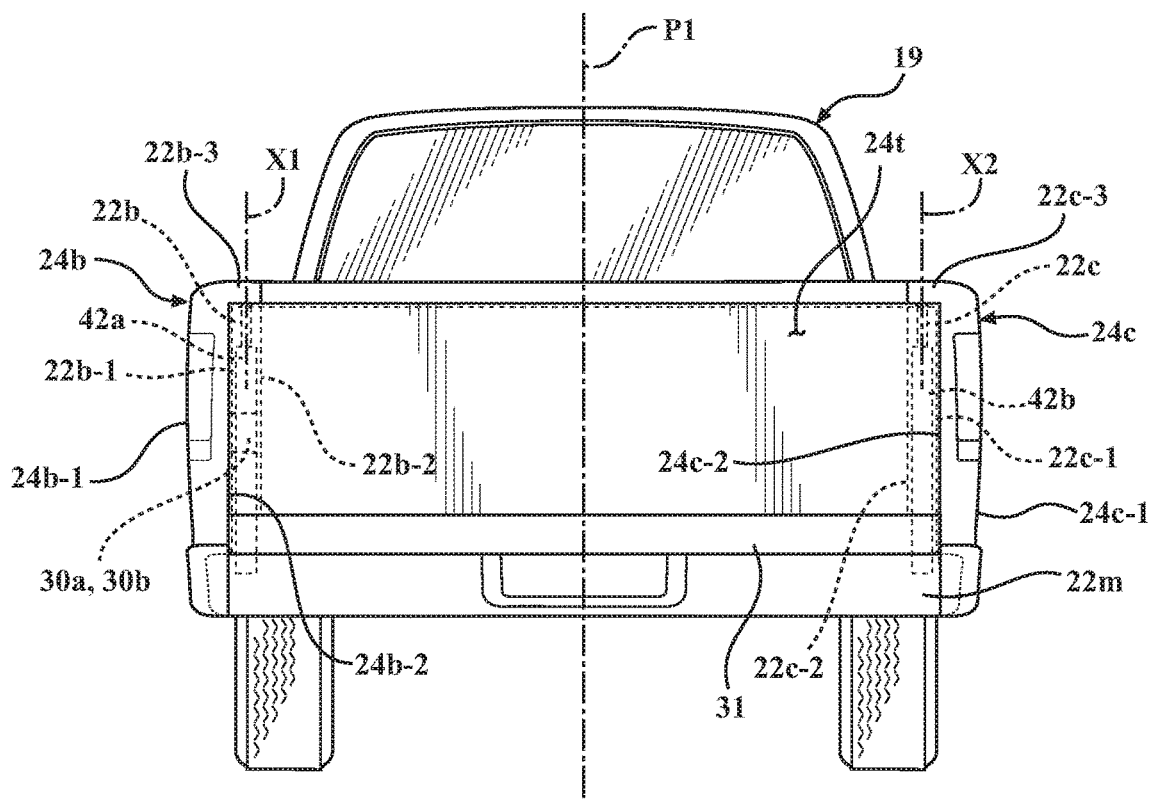
FIG. 2C is a schematic rear view of the expandable height cargo bed system shown in FIGS. 2A and 2B.
Figure 3A:
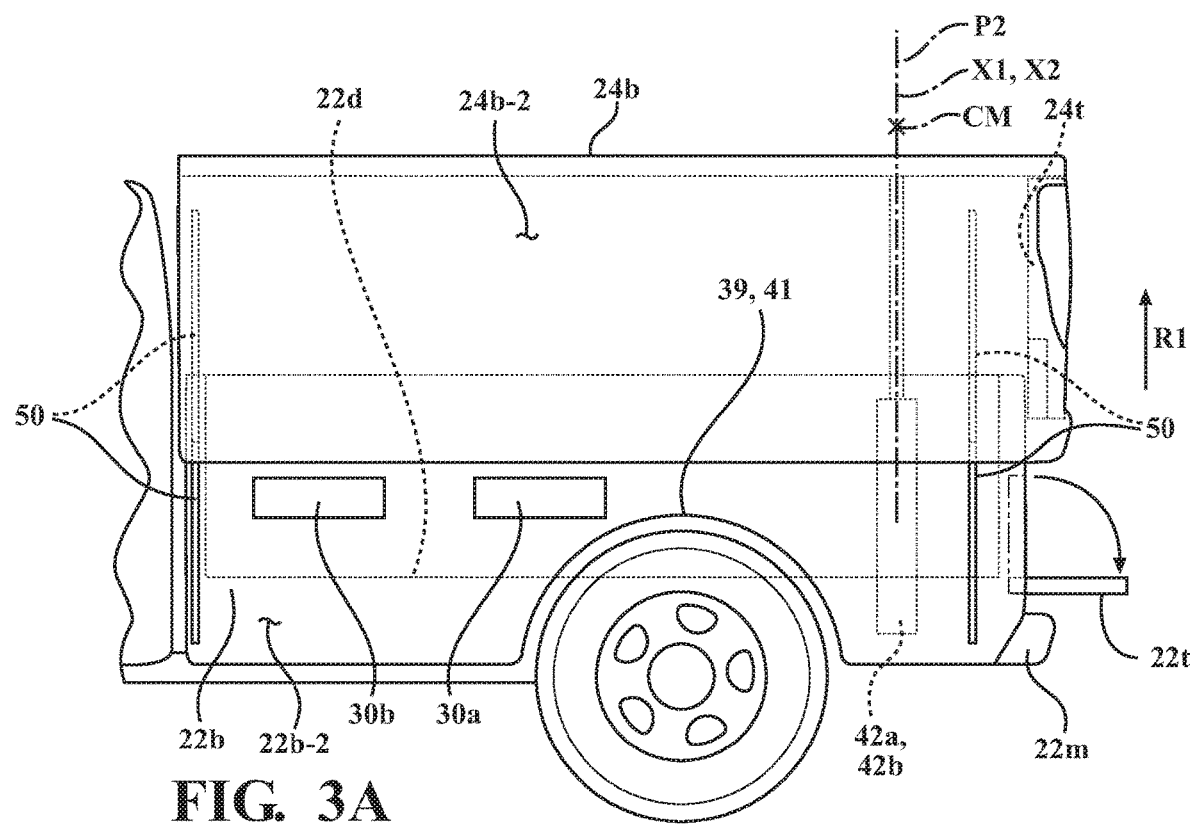
FIG. 3A is a schematic side view of the expandable height cargo bed system shown in FIGS. 2A-2C, showing the outer shell in the raised position.
Figure 3B:
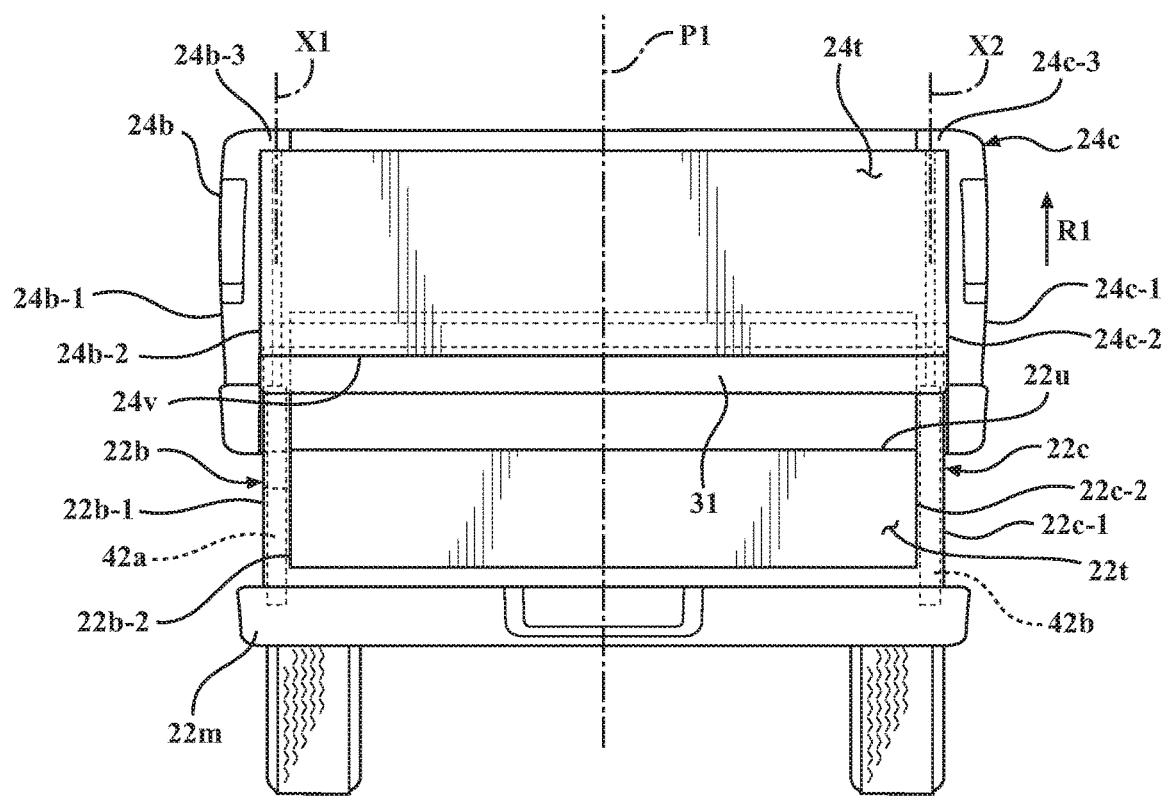
FIG. 3B is a schematic rear view of the expandable height cargo bed system shown in FIG. 3A.

FIG. 1 is a schematic perspective view of a vehicle 19 incorporating a cargo bed system (generally designated 20), in accordance with an embodiment described herein. The system 20 is designed so that the cargo bed is expandable by increasing a height of the cargo bed 29. The cargo bed system 20 may include an inner shell 22 and an outer shell 24 operably coupled to the inner shell 22 so as to be movable with respect to the inner shell 22 between a lowered position and a raised or elevated position, so as to vary the height of the cargo bed. FIGS. 1-2C show the outer shell 24 in the lowered position. FIGS. 3A-3B show the outer shell 24 in a raised position.

The inner shell 22 may be statically mounted on the vehicle frame or another portion of the vehicle so as to be fixed with respect to the portion of the vehicle on which it is mounted. Inner shell 22 may include a front wall 22a, a first sidewall 22b, a second sidewall 22c positioned opposite the first sidewall 22b, and a floor portion 22d extending between the first and second sidewalls 22b, 22c and the front wall 22a. The front wall 22a may serve as a front wall of the vehicle cargo bed 29.

Unless stated otherwise, the structure of the inner shell second sidewall 22c may be the same as the structure of the inner shell first sidewall 22b, with the second sidewall 22c structured as a "mirror image" of the first sidewall 22b with respect to a vertical plane P1 (FIG. 2C) extending coincident with a fore-aft axis of the vehicle 19 and generally bisecting a distance between the inner shell first sidewall second side 22b-2 and the inner shell second sidewall second side 22c-2 and extending perpendicular to the plane P1.

At least one cargo bed access passage 30 may extend through the inner shell first sidewall 22b between a first side 22b-1 of the inner shell first sidewall 22b and a second side 22b-2 of the inner shell first sidewall 22b opposite the first side 22b-1. The embodiment shown in the drawings includes first and second cargo bed access passages, 30a and 30b, with second passage 30b positioned forwardly (i.e., in a forward direction of the vehicle) of, or with respect to, the first passage 30a. The cargo bed access passage 30a may enable user access to a middle portion of the cargo bed 29 through the inner shell first sidewall 22b. A door (not shown) may cover and/or seal the access passage 30a when the passage is not being used. In one or more arrangements, another cargo bed access passage 30b may enable user access to a front or forward portion of the cargo bed 29 through the inner shell first sidewall 22b. A door (not shown) may cover and/or seal the access passage 30b when the passage is not being used. In one or more arrangements, the inner shell second sidewall 22c may also include one or similarly structured access passages (not shown), associated doors and/or compartments as described herein.

An inner shell tailgate 22t may extend between (and be rotatably connected to) rear ends of the inner shell first and second sidewalls 22b, 22c. The inner shell tailgate 22t may be structured to be operable (i.e., lowered and raised) separately from the outer shell tailgate 24t (described in greater detail below). To this end, the inner shell tailgate 22t may be dimensioned so that an uppermost edge 22u of the inner shell tailgate 22t may be spaced apart from a lowermost edge 24v of the outer shell tailgate 24t when the outer shell 24 is in the raised position as shown in FIG. 3B. The inner shell tailgate 22t may be structured and mounted to the inner shell 22 so that an interior surface 22s of the tailgate 22t is coplanar or substantially coplanar with the cargo bed floor portion 22d when the inner shell tailgate 22t is in the lowered condition, as shown in FIGS. 1 and 2A.

A tailgate is considered to be in a lowered condition when the interior surface (i.e., a surface of side of the tailgate facing into the cargo bed) is coplanar or substantially coplanar with the cargo bed floor portion 22d, thereby facilitation transfer of cargo to and from the cargo bed along the tailgate. Similarly, a tailgate is considered to be in a raised condition when the tailgate is in a vertical or near vertical orientation (as shown in FIGS. 2B and 2C, for example) in which it may be locked or secured to impede entry to and from the cargo bed.

As used herein, the term "substantially" includes exactly the term it modifies and slight variations therefrom. Thus, the term "substantially perpendicular" means exactly perpendicular and slight variations therefrom, and the term "substantially coplanar" means exactly coplanar and slight variations therefrom. In particular examples, slight variations therefrom can include dimensions within normal manufacturing tolerances depending on the materials and methods used in fabricating the components described herein and attaching or mounting these components to each other.

A vehicle bumper 22m may be mounted to the vehicle 19 below the rear of inner shell 22. The bumper may be incorporated into the structure of the inner shell 22 or the bumper may be mounted to the vehicle 19 separately from the inner shell 22. The bumper 22m may be spaced apart from a level of the floor portion 22d of the cargo bed 29 to provide space for outer shell tailgate 24t to be folded down or lowered, and also to provide space for a cross beam 31 (described below) connecting lower rear portions of the outer shell sidewalls 24b, 24c.

The outer shell 24 may be operably coupled to the inner shell 22 so as to be movable with respect to the inner shell between a lowered position and a raised position, so as to vary a height of the cargo bed 29. In one or more arrangements, the outer shell 24 may include a first sidewall 24b and a second sidewall 24c positioned opposite the outer shell first sidewall 24b.

Unless stated otherwise, the structure of the outer shell second sidewall 24c may be the same as the structure of the outer shell first sidewall 24b, with the second sidewall 24c structured as a "mirror image" of the first sidewall 24b with respect to the vertical plane P1.

As seen in FIG. 2C, outer shell first sidewall 24b may include an overhang 24b-3 extending over the top of the associated the inner shell first sidewall 22b to where an edge of the overhang 24b-3 is coplanar or substantially coplanar with an interior surface of the inner shell first sidewall 22b. Outer shell second sidewall 24c may include an overhang 24c-3 extending over the top of the associated the inner shell second sidewall 22c to where an edge of the overhang 24c-3 is coplanar or substantially coplanar with an interior surface of the inner shell second sidewall 22c.

A first cross beam 33 may connect the outer shell first and second sidewalls 24b, 24c along a region above the cargo bed front wall 22a defined by the inner shell 22. A second cross beam 31 may connect the outer shell first and second sidewalls 24b, 24c along a region residing below the outer shell tailgate 24t and above the bumper 22m.

As seen in the drawings, the outer shell first sidewall 24b may have a first side 24b-1 and a second side 24b-2 residing opposite the first side 24b-1 and inboard (i.e., in a direction toward the plane P1) of the first side 24b-1. Also, the outer shell second sidewall 24c may have a first side 24c-1 and a second side 24c-2 residing opposite the first side 24c-1 and inboard (i.e., in a direction toward the plane P1) of the first side 24c-1. In addition, the outer shell first sidewall second side 24b-2 may reside opposite the inner shell first sidewall first side 22b-1 and outboard (i.e., in a direction away from the plane P1) of the inner shell first sidewall first side 22b-1. Also, the outer shell second sidewall second side 24c-2 may reside opposite the inner shell second sidewall first side 22c-1 and outboard (i.e., in a direction away from the plane P1) of the inner shell first sidewall second side 22c-1.

In addition, the outer shell first sidewall 24b may be structured so as to cover the inner shell first sidewall cargo bed access passage(s) 30 when the outer shell 24 is in the lowered position. Also, the outer shell first sidewall 24b may be structured such that the inner shell first sidewall cargo bed access passage(s) 30 are not covered by the outer shell first sidewall 24b when the outer shell 24 is in the raised position. This arrangement prevents access to the inner shell first sidewall cargo bed access passage(s) 30 when the outer shell 24 is in the lowered position, and enables access to the inner shell first sidewall cargo bed access passage(s) 30 when the outer shell 24 is in the raised position.

The outer shell second sidewall 24c may reside adjacent the inner shell second sidewall 22c and may be structured to block or enable access to one or more cargo bed access passage(s) (not shown) formed in the inner shell second sidewall 22c, in a manner similar to that described with regard to the inner shell first sidewall 22b and the outer shell first sidewall 24b.

Outer shell tailgate 24t may be rotatably mounted to the outer shell 24 so as to extend between the outer shell first and second sidewalls 24b, 24c. Outer shell tailgate 24t may be operable independently of inner shell tailgate 22t. When the outer shell 24 is raised in direction R1 as shown in FIGS. 3A and 3B, the outer shell tailgate 24t may be raised and locked to form a rear portion of the extended-height cargo bed. When the outer shell 24 is lowered, the outer shell tailgate 24t may reside rearwardly (i.e., in a direction toward a rear of the vehicle) of the inner shell tailgate 22t. The outer shell tailgate 24t may be structured and mounted to the outer shell 24 so that an interior surface 24s of the tailgate 24t is coplanar or substantially coplanar with the cargo bed floor portion 22d when the outer shell tailgate 24t is in the lowered condition shown in FIGS. 1 and 2A.

The outer shell tailgate 24t may also include a cavity 35 formed in the interior surface 24s. The cavity 35 may be structured to receive the inner shell tailgate 22t therein when the inner shell tailgate 22t is lowered, as shown in FIGS. 1 and 2A. Thus, in this arrangement, the inner surfaces 22s, 24s of the inner shell tailgate 22t and the outer shell tailgate 24*t* may be coplanar or substantially coplanar when both tailgates are lowered, to facilitate movement of cargo in and out of the cargo bed 29.

One or more actuators 42 may be operably coupled to the outer shell to enable the outer shell to be raised and lowered responsive to commands from a user. In one or more arrangements, actuator(s) 42 in the form of hydraulic cylinders may be used. In the embodiment shown, two cylinders 42*a* and 42*b* are used, with one cylinder mounted in each of inner shell sidewalls 22*b* and 22*c*. In one example, the actuators may be mounted inside the inner shell sidewalls 22*b*, 22*c*. Where cylinders are used, shafts of the cylinders may be coupled to outer shell overhangs 24*b*-3, 24*c*-3. In one or more arrangements, the cylinders 42*a*, 42*b* may be mounted rearwardly of associated rear wheel wells 39, 41 of the vehicle and as close to the wheel wells as feasible for a given vehicle design. This positioning of the cylinders 42*a*, 42*b* may aid in balancing the weight of the outer shell 24 so that a center of mass CM of the outer shell 24 lies along a vertical plane P2 passing through lifting axes X1, X2 of the cylinder rods. The plane P2 may also extend perpendicular to the plane P1.

The materials used to fabricate the outer shell 24 and the particular structure of the outer shell may be adapted (in conjunction with the mounting positions of the cylinders 42*a*, 42*b*) to aid in locating the center of mass CM of the outer shell 24 along the vertical plane P2 of the lifting axes X1, X2 of the cylinder rods, or as close as possible to the plane P2. Metals, polymers, and/or any other suitable materials may be used.

In other arrangements, one or more additional cylinders (not shown) may be mounted in the inner shell sidewalls 22*b*, 22*c* forwardly of the wheel wells 39, 41 and the cylinders 42*a*, 42*b* just described, to provide additional lifting capability. Alternatively, the cylinders and/or other actuators may simply be attached to the first sides of the inner shell first wall and second wall. Other types of actuators (such as various mechanical actuators, electric actuators, pneumatic actuators, etc., as well as combinations of these) may also be used to raise and lower the outer shell.

Suitable bearings 50 (such as linear motion bearings) may be mounted on inner shell first sidewall first side 22*b*-1 and/or on outer shell first sidewall second side 24*b*-2 to facilitate motion of the outer shell 24 with respect to the inner shell 22, to facilitate distribution of the weight of the outer shell 24 during raising and lowering of the outer shell, and to aid in supporting the raised outer shell when the cargo bed is loaded. Similarly, suitable bearings 50 may be mounted on inner shell second sidewall first side 22*c*-1 and/or on outer shell second sidewall second side 24*c*-2 to facilitate motion of the outer shell 24 with respect to the inner shell 22, to facilitate distribution of the weight of the outer shell 24 during raising and lowering of the outer shell, and to aid in supporting the raised outer shell when the cargo bed is loaded.

The actuator(s) 42 may be controlled by any suitable control mechanism, for example, a key fob or a push button or keypad control (not shown) located in a cab or occupant compartment of the vehicle.

To extend the height of the cargo bed 29, a user may operate the actuator(s) 42 so as to raise the outer shell 24. This also exposes the cargo bed access passages 30*a*, 30*b*, thereby enabling access to the cargo bed 29 through the inner shell sidewall 22*b*. When the outer shell 24 is raised, outer shell tailgate 24*t* acts as an extended-height rear wall for the expanded cargo bed. In addition, the inner shell tailgate 22*t* may be operated to open the cargo bed 29 at the level of the cargo bed floor portion 22*d*, similar to operation of a conventional tailgate.

When the outer shell 24 is lowered, the cargo bed access passages 30*a* and 30*b* are covered and concealed. In addition, cargo may be loaded and unloaded by first lowering the outer shell tailgate 24*t*. When the outer shell tailgate 24*t* is lowered, the inner shell tailgate 22*t* may then be lowered into the cavity 35 formed in the outer shell tailgate 24*t*, thereby forming a combined, single-level tailgate surface for the movement of cargo therealong.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A cargo bed system for a vehicle, the system comprising:
    an inner shell; and
    an outer shell operably coupled to the inner shell so as to be movable with respect to the inner shell between a lowered position and a raised position so as to vary a height of a cargo bed defined by the cargo bed system, wherein the inner shell has an inner shell tailgate rotatably coupled thereto, and wherein the outer shell has an outer shell tailgate operably coupled thereto and residing rearwardly of the inner shell tailgate.

2. A cargo bed system for a vehicle, the system comprising:
    an inner shell; and
    an outer shell operably coupled to the inner shell so as to be movable with respect to the inner shell between a lowered position and a raised position so as to vary a height of a cargo bed defined by the cargo bed system, wherein the inner shell includes an inner shell first sidewall having at least one cargo bed access passage extending between a first side of the inner shell first sidewall and a second side of the inner shell first sidewall opposite the first side, wherein the outer shell has an outer shell first sidewall structured to cover the at least one cargo bed access passage when the outer shell is in the lowered position, and structured such that the at least one cargo bed access passage is not covered by the outer shell first sidewall when the outer shell is in the raised position, and wherein the outer shell first sidewall does not have a bed access passage formed therein.

3. The cargo bed system claim 2 wherein the inner shell first sidewall has a first cargo bed access passage extending between the first side of the inner shell first sidewall and the second side of the inner shell first sidewall opposite the first side, and a second cargo bed access passage extending between the first side of the inner shell first sidewall and the second side of the inner shell first sidewall opposite the first side, and wherein the second cargo bed access passage is positioned forwardly of the first cargo bed access passage.

4. The cargo bed system of claim 2 wherein the outer shell first sidewall has a first side facing in a direction away from the cargo bed and a second side residing opposite the outer shell first sidewall first side and also outboard of the first side of the inner shell first sidewall.

5. The cargo bed system of claim 1 wherein the outer shell tailgate includes a cavity structured to receive at least a portion of the inner shell tailgate therein when the outer shell tailgate is in a lowered position and the inner shell tailgate is also in a lowered position.

6. A vehicle including a cargo bed system in accordance with claim 1.

7. A vehicle including a cargo bed system in accordance with claim 2.

\* \* \* \* \*